United States Patent
Galway et al.

(10) Patent No.: US 6,650,646 B1
(45) Date of Patent: *Nov. 18, 2003

(54) DIGITAL COMMUNICATIONS SYSTEM

(75) Inventors: Keith Galway, Manotick (CA); James Watt, Kanata (CA); Duncan Glendinning, Kanata (CA); Eugene Zywicki, Nepean (CA); Wayne Burwell, Ottawa (CA); Dave Coomber, Nepean (CA); Tom Duxbury, Dunrobin (CA); Nutan Behki, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/134,606

(22) Filed: Aug. 14, 1998

Related U.S. Application Data

(63) Continuation-in-part of application No. 08/676,256, filed as application No. PCT/CA95/00029 on Jan. 20, 1995, now Pat. No. 5,818,842.

(30) Foreign Application Priority Data

Jan. 21, 1994 (GB) .............................................. 9401092

(51) Int. Cl.[7] .............................................. H04L 12/28
(52) U.S. Cl. ....................................... 370/397; 370/406
(58) Field of Search ................................ 370/349, 244, 370/246, 249, 250, 351, 352, 389, 392, 241.1, 395.1, 396–399, 400, 401, 409, 420, 422, 463, 474, 465, 252, 254, 395.53, 406, 407, 408, 360; 709/249

(56) References Cited

U.S. PATENT DOCUMENTS

| | | | | |
|---|---|---|---|---|
| 5,420,858 A | * | 5/1995 | Marshall et al. | 370/352 |
| 5,457,681 A | * | 10/1995 | Gaddis et al. | 370/466 |
| 5,539,736 A | * | 7/1996 | Johnson et al. | 370/420 |
| 5,541,911 A | * | 7/1996 | Nilakanatan et al. | 370/422 |
| 5,548,587 A | * | 8/1996 | Bailey et al. | 370/395 |
| 5,566,173 A | * | 10/1996 | Steinbrecher | 370/466 |
| 5,581,558 A | * | 12/1996 | Horney et al. | 370/466 |
| 5,617,422 A | * | 4/1997 | Litzenberger et al. | 370/401 |
| 5,623,488 A | * | 4/1997 | Svennevik et al. | 370/401 |
| 5,623,605 A | * | 4/1997 | Keshav et al. | 370/401 |
| 5,640,512 A | * | 6/1997 | Cserwice | 370/241 |
| 5,930,257 A | * | 7/1999 | Smith et al. | 370/401 |
| 6,006,275 A | * | 12/1999 | Picazo et al. | 370/351 |
| 6,046,992 A | * | 4/2000 | Meier et al. | 370/256 |
| 6,411,620 B1 | * | 6/2002 | Takase et al. | 370/390 |

* cited by examiner

Primary Examiner—Dang Ton
(74) Attorney, Agent, or Firm—Marks & Clerk

(57) ABSTRACT

A computer communications network comprises a plurality of interconnected ATM switches forming a WAN or LAN area network over which ATM cells are transmitted, and a plurality of user devices including LAN interface adapters for connection to one or more to local area networks (LANs). An interface device connects at least some of the respective ATM switches to the LAN interface adapters. The interface adapts the ATM cells for transport over the LANS. The user devices can thus communicate through the LAN interface adapters transparently with the wide area network.

7 Claims, 10 Drawing Sheets

DIGITAL COMMUNICATIONS SYSTEM

CROSS REFERENCE TO RELATED APPLICATION

This application is a continuation-in-part of U.S. patent application Ser. No. 08/676,256 filed Sep. 16, 1996, and which is the national stage pursuant to 35 UCS 371 of PCT application No. PCT/CA95/00029 filed Jan. 20, 1995.

FEILD OF THE INVENTION

This invention relates to a digital communications system for interconnecting user devices.

BACKGROUND OF THE INVENTION

There are various types of digital communications systems for establishing communications between digital user devices, such as computers and workstations.

For example, a system designed to interconnect computers over a restricted geographical area (generally up to about one mile) is known as local area network (LAN). One example of such as system is Ethernet, which was designed by Xerox during the late 1970's. This operates at 10 MBs and the data are sent over twisted pairs in the form of Ethernet frames.

For greater distances, wide area networks (WANs) are employed. One form of WAN employs ATM (Asynchronous Transfer Mode). ATM employs 53 byte cells as a basic unit of transfer. Each ATM cell is divided into 5 bytes of ATM layer overhead and 48 bytes of ATM payload. An ATM network is essentially statistical in nature with the ATM cells being transmitted over virtual channels established within the network.

Through the use of a cell switching multiplexing scheme, ATM exploits bandwidth utilization by taking advantage of the statistical multiplexing benefits of a switching fabric. In a homogeneous ATM environment, ATM terminal adapters are connected to the ATM switching fabric, forming a potentially fully meshed logically connected communications infrastructure. An ATM adapter is any edge device which interfaces the ATM cell stream to an ATM services consumer. Typical examples of ATM adapters include ATM network interface cards (NICs) for digital computers.

Generally, networked computers are provided with LAN adapters for connection to a local area network, such as Ethernet. Such LAN adapters do not permit them to be connected to Wide Area Networks, such as ATM networks. While it is possible to fit special ATM adapter cards into networked computers, this requires physically accessing the computers and supplying appropriate driver software.

PCT application WO/93/26107 discloses an ATM-Ethernet portal, which assembles ATM cells into Ethernet frames and vice versa so as to enable devices attached to remote Ethernet LANs to communicate transparently over an ATM network. A portal located between each Ethernet segment and the ATM network segments outgoing Ethernet frames into ATM cells and vice versa. The portals operate at a low level in the ISO model and are not capable of communicating with non-Ethernet devices. Protocols located above the data link layer (layer 2) are not interpreted by the portals.

In one embodiment, the Ethernet frames are sent from one Ethernet to another over a virtual circuit configured by hand. This is an inefficient and time-consuming process. In another embodiment, permanent virtual circuits are established through the ATM network between each pair of portals, and a transmitting portal sends cells to each portal. This is an inefficient use of bandwidth since cells must be sent to all the portals, needlessly clogging up the network.

In another embodiment, a Connection Processor attached to a host on one of the Ethernet segments sends out instructions to configure the multipoint connections between the portals attached to the various Ethernet segments. The transmitting portal then sends outgoing ATM cells to all portals on the multi-point connection (inefficient use of bandwidth). In another embodiment, a primitive form of routing is employed in that the Connection processor advises the local portal which one of the pre-established virtual circuits to send the cells out on. This only works if the connection processor attached to the local portal has already set up a PVC to that remote portal.

In PCT application WO/93/26107, permananent virtual circuits are required between each pair of portals, which severely limits the size of the system. This is analogous to an unswitched telephone system, where each pair of telephones must be connected to each other. The number of connections increases exponentially with the number of telephones. Furthermore, each portal must know which circuit leads to the portal to which the destination device is connected, so each look-up table in each portal must be updated each time a device is attached to the network. The system described in the above application is intended only for a small number of portals. If no circuit exists to a portal, the portals cannot communicate over the network.

Finally, the system described in the above PCT application is merely designed to transport Ethernet frames over an ATM fabric between Ethernet segments. It does not permit communication between an Ethernet-attached device and an ATM-attached device.

EP 473,066 describes a network wherein LANs are connected to an ATM network via respective bridges. Each bridge maintains the addresses of all the devices on the network. The problem with this arrangement is that it is not responsive to the presence of new terminals, so if a bridge does not know the address of a destination terminal, it has to flood the entire ATM network, thus undesirably consuming large amounts of bandwidth.

EP 524, 316 also describes a system for interconnecting LANs (connectionless networks) through ATM fabrics (connection-oriented networks). In this system, connectionless servers are associated with each ATM switch, and segmented LAN frames must first be routed as ATM cells through a permanent virtual connection (PVC) to a sending server and then from the sending server through the ATM fabric to the receiving server, from where the cells are sent over a second permanent virtual connection to a reassembler. While this is an improvement described in the prior art to this patent, this system requires a connectionless server to be associated with each switch and and PVC (which is expensive) to be maintained between the connectionless server and terminal it serves. Furthermore, each connectionless server has to maintain the numbers of the destination terminals. If the connectionless serve does not know the destination address, it cannot forward the cells to the correct destination without flooding the network, an operation which consumes large amounts of useless bandwidth.

All the prior art systems are designed as a means of establishing communication between devices attached to LANs interconnected through an ATM network. None of these systems contemplates the possibility of LAN-attached devices communicating with other devices directly connected to the ATM network.

An object of the invention is to alleviate these disadvantages.

SUMMARY OF THE INVENTION

According to the present invention there is provided a digital communications system comprising: a connection-oriented transport fabric; a plurality of user devices attached to the system, at least some of said user devices including LAN interface adapters for connection to said transport fabric through one or more local area networks (LANs); interface means between said transport fabric and said user devices storing the location of said user devices, said interface means between said transport fabric and said user devices that are connected to LANs adapting LAN traffic for transport over said transport fabric; and a centralized route server connected to said transport fabric storing address data pertaining to the location of said user devices attached to the system, said centralized route server exchanging data over said transport fabric with said interface means to learn the locations of said user devices and to distribute such information to said interface means so as to permit said interface means to establish direct transparent communication on demand using a dynamic mesh of virtual connections between a said user device connected thereto and another said user device attached to the system.

In accordance with the invention the user devices, which may be personal computers, video or audio devices, can be interconnected over the ATM network using their existing LAN adapters. The whole network, including the ATM switch fabric, thus acts as a virtual LAN.

For the purposes of this specification, the term packet is used to mean any package of data regardless of layer that is exchanged between devices and includes cells and frames.

In one embodiment, the ATM cells are encapsulated in LAN frames and delivered in encapsulated form over the Ethernet LAN direct to the LAN adapter cards. In another embodiment, the interface means provide bridging, network-layer forwarding and LAN emulation functions to permit transparent communication between any of said user devices over the ATM network. Such a device creates LAN frames from the ATM cells and vice versa, and is known as a ridge or bridge/router.

An advantage of this arrangement is that neither the network interface adapters nor the accompanying driver software at the local workstations require replacement.

The entire ATM network is modeled as a distributed router, which shares topology and reachability information with external routing peers. Connections within the network are set up on demand, using lightweight signaled calls routed through predefined virtual paths, each containing multiple connections with similar traffic characteristics. Since each connection has only a small committed information rate, but is allowed to burst to the level of the virtual path which contains it, resources are controlled while still achieving statistical gains from the aggregation of traffic.

The network of ATM switches emulates a LAN and the system functions as an extremely large, distributed bridge/router. Devices connecting to the system "believe" they are connecting to a large LAN. Somewhere on the LAN there appears to be a router, through which many more networks can be reached. The devices are completely unaware of the true architecture of the system. They have no way of knowing that the LAN is being extended over the ATM fabric, and that the networks behind the "router" are also part of that same ATM fabric. Routers connected to the system also view it as a LAN with an attached router. Routing information is exchanged between the external router, or route server, and the ridge using standard routing protocols.

BRIEF DESCRIPTION OF THE DRAWINGS

The invention will now be described in more detail, by way of example only, with reference to the accompanying drawings, in which.

DESCRIPTION OF PREFERRED EMBODIMENTS

Figure 1:
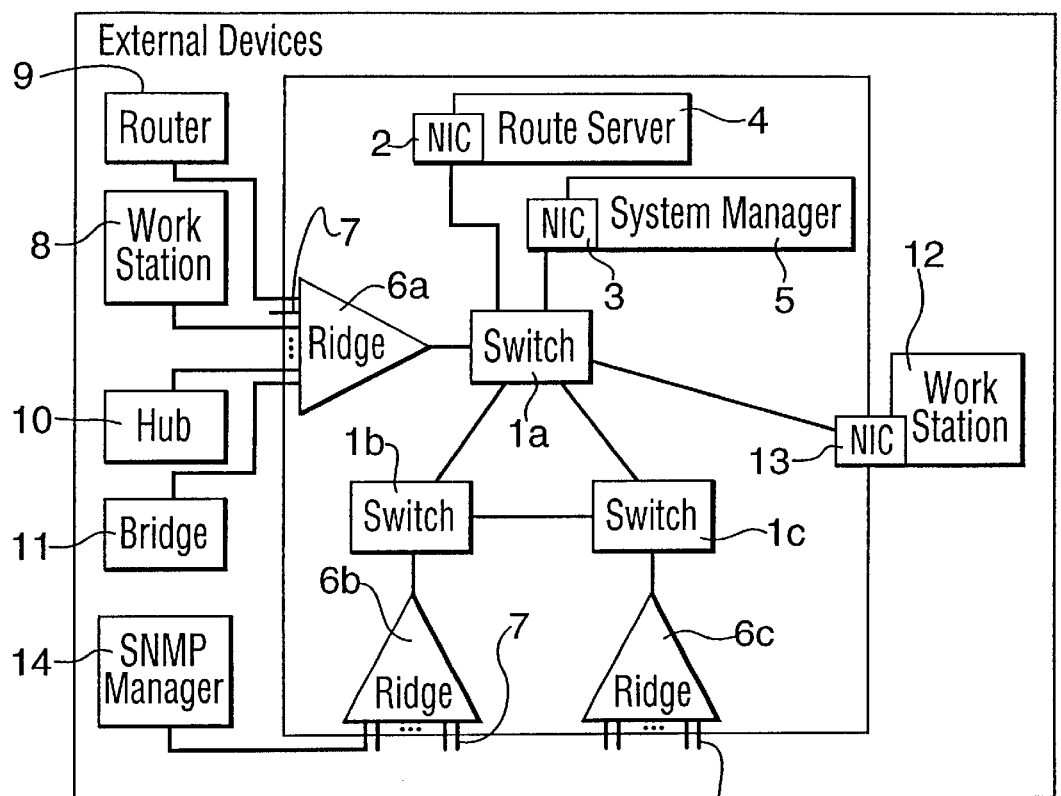
FIG. 1 is a block diagram of a wide area network operating in accordance with a first embodiment of the invention.

Referring now to FIG. 1, ATM switches 1a, 1b, 1c define a wide area Asynchronous Transfer Mode network (WAN). Switch 1a is connected through network interface card (NIC) 2 to route server 4, and through network interface card (NIC) 3 to system manager 5.

Workstation 12 is connected in a conventional manner via Network Interface Card (NIC) 13 to the Wide Area Network. NIC 13 is specifically adapted to connect the workstation 12 to the ATM network.

Switches 1a, 1b, 1c are also connected through WAN-LAN interface devices 6, known as ridges, to router 9, workstation 8, hub 10, bridge 11 and SNMP manager 14, which each have Local Area Network adapters for connection to a Local Area Network, in this case Ethernet.

Devices 8, 9, 10 and 11 are connected to respective Ethernet ports of ridge 6a, and SNMP manager 14 is shown connected to one of the Ethernet ports of ridge 6b.

The wide area network operates under control of the route server 4, which translates from the connection-less model of traditional LANs to the connection-oriented model of ATM. It implements traditional routing-table computation protocols (e.g., RIP and OSPF) and communicates with external routers to learn the extended topology of the connection-less network. It also discovers the presence of all other external devices to complete its knowledge of the topology of the connection-less network.

The route server 4 learns the topology of the ATM network from the System Manager 5 and configures the ridges 6, as required to map between the ATM topology and the LAN topology.

The function of the route server 4 is to maintain the topology of the devices attached to the ATM-LAN system. The topology information is used to forward and route LAN traffic from source to destination over an ATM network. Traffic forwarding is done by the route server and also by the ridges 6 using information that the route server conveys to them about the topology. This ability to allow devices to connect anywhere in the network that the configuration allows is unique to this system, and the function is performed by the route server topology management.

The route server 4 thus contains the administrative information that defines a virtual LAN, such as the LAN network numbers and device membership, filters and access restrictions.

The route server knows the layout of switches and trunks, and discovers the presence of all attached devices. The route server uses this complete network knowledge to ensure that packets are forwarded through the system correctly, using a dynamic mesh of ATM connections.

In smaller networks, the route server 4 also acts as an ARP Server, and a Broadcast Server (larger networks will contain several separate Route, ARP, and Broadcast Servers). In this role, the route server 4 forwards broadcast traffic to any other network elements that need to receive it. This allows the route server 4 to employ various heuristics and optimizations to limit the amount of broadcast traffic flowing through the network. For example, ARP requests can often be handled directly by the route Server, which already knows the addresses of most devices present in the network. For those packets that need to be flooded, the Route Server can send a single copy of the packet to each Ridge that the broadcast is intended for, along with a mask to indicate the ports over which the packet is to be flooded.

Figure 12:
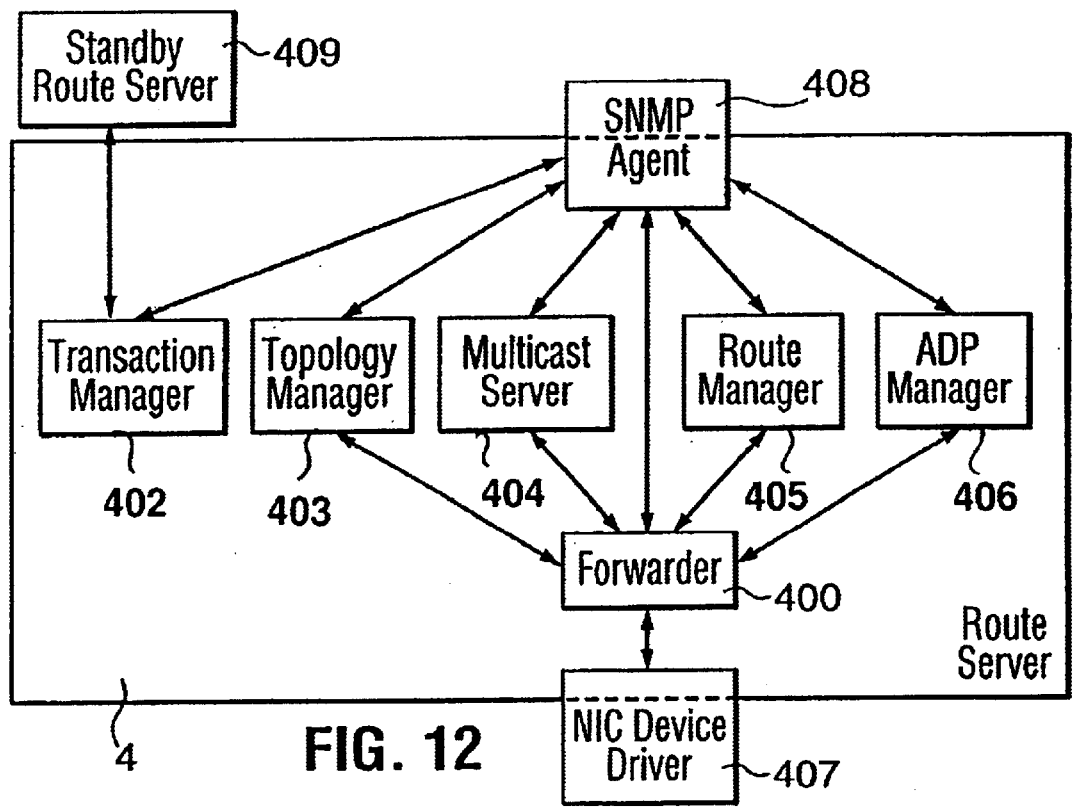
FIG. 12 is a more detailed block diagram of a route server for ATM-LAN network.

A simplified block diagram of the route server 4 is shown in FIG. 12. The route server 4 comprises a Centralized Routing and Forwarding Server 400, a NIC device driver 407, a transaction manager 402, a topology manager 403, a multicast server, 404, a route manager 405, and an ADP manager 406. Devices 402 to 406 are connected to forwarder 400 and SNMP agent 408. Transaction manager 402 is connected to standby server 409. Forwarder 400 is connected directly to SNMP agent 408.

The route server 4 maintains intelligence about the location of all devices on the system. This information is learned dynamically as devices attach to the network and is learned through communication via standard Routing Protocols, e.g. IP and IPX with Routers on the edge of the system. The intelligence is distributed to ridges 6 via an Address Distribution Protocol. The communication with the ridges 6 allows the ridges to perform data forwarding directly on the majority of data.

The Centralized Multicast Server 404 processes all multicast traffic. Where possible, the route server 4 responds to the sent data without further broadcasting into the network.

The route server 4 also carries out LAN topology management to dynamically allow Adds, Moves and Changes of LAN devices; and to perform Admission Control on devices against rules configured by the System Administrator. The devices 9 to 14 attached to an ATM LAN are dynamically discovered by the route server and admitted into the network if allowed. The ridges 6 participate in the discovery by detecting the device. The route server determines if admission is allowed and if so what services are allowed. The route server 4 also maintains knowledge about the location of the device for long periods of time. The route server 4 allows devices of dissimilar networks to share ports into the system.

The route server 4 also provides Flexible, portable and redundant platform support. The route server is run on a SUN workstation with an ATM network interface card supporting both single and multiprocessor platforms. A redundant route server 409 is supported and takes over in case of failure of the primary route server 400. An ATM-based messaging protocol is used between the two platforms to ensure coordination.

One of the advantages of the described architecture is that it permits the use of remote monitoring of the ridge. The data from a monitored port, including errors, is transmitted over the network to a remote monitoring port so as to replicate the data from the monitored port at the remote monitoring port. This enables tests to be conducted on the monitored port remotely as if on-site.

Preferably, monitored packets are tagged to prevent them from being treated as normally received packets by the receiving ridge.

Returning to FIG. 1, each ATM Switch 1 provides high-bandwidth cell-switching that is the core of the System. There are three types of ATM switch, namely an ATM Workgroup Switch (WGS), a 36170 Switching Shelf and a 36170 Access Shelf.

The WGS is a low-cost, 12-port, 1.6 Gbit/s ATM switch for use in Customer-Premise applications. The 36170 Switching Shelf is a 12.8 Gbit/s ATM switch which interconnects up to 8 ATM Feeder Switches and/or Access Shelves. The 36170 Access Shelf is a 12-slot, 1.6 Gbit/s ATM switch. Each slot can contain one of many ATM interfaces. The WGS is described in more detail with reference to FIGS. 13 and 14.

Figure 13:
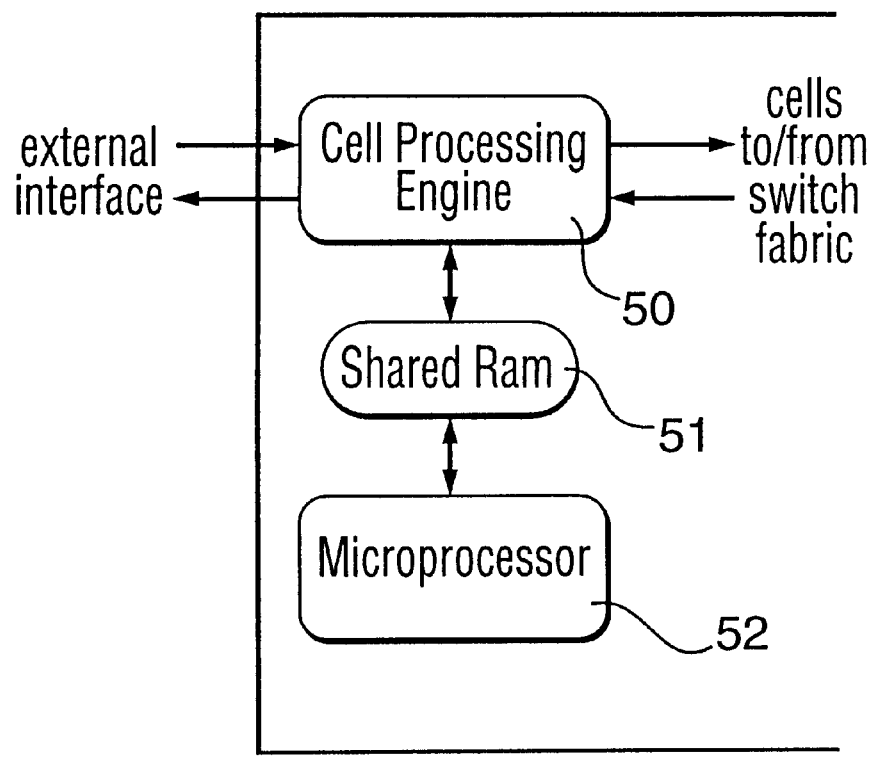
FIG. 13 shows a prior art OAM processing resource for an ATM switch.

Currently, ATM switches that provide OAM (Operation and Management) support at an ingress port require a dedicated microprocessor 52 to interpret and generate OAM cells. OAM (Operation and Management) cells are transferred to/from the microprocessor 52 by cell processing engine 50 using shared-RAM 51 as shown in FIG. 13.

The drawback to this approach is that additional cost and complexity (PCB area, addition components, shared RAM systems) is required to support the OAM functionality. This addition cost hinders the ability to make a cost competitive, full featured, multi-port switch.

Figure 14:
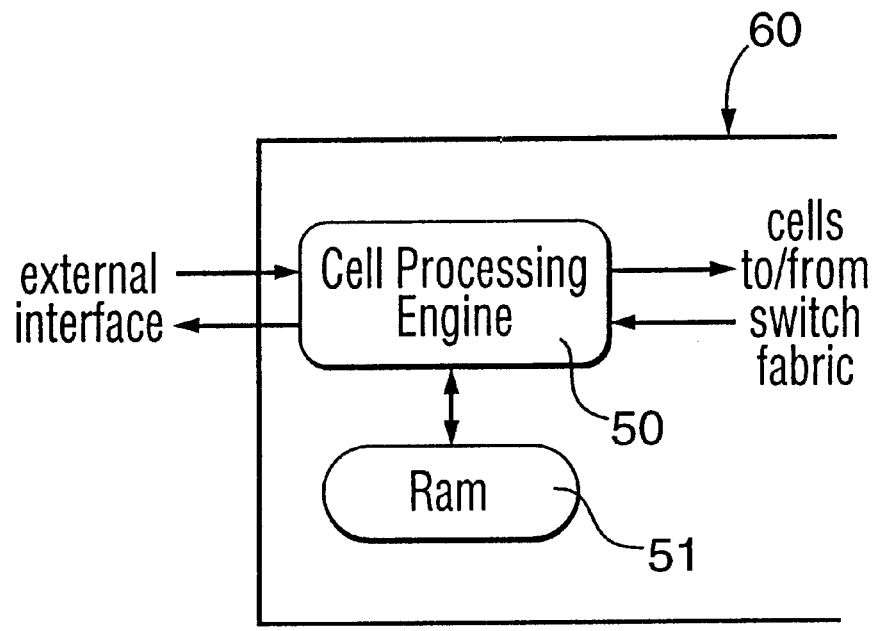
FIG. 14 shows an OAM processing resource according to one embodiment of the invention.

In accordance with the invention as shown in FIG. 14, the cell processing engine is modified to redirect all relevant OAM cells to a centralized OAM processing resource using a preconfigured internal switch address. All processing of the cells occurs at his one microprocessor, and this eliminates the need for a dedicated microprocessor 52 on each port, as shown in FIG. 14.

In one suitable scheme, cells with VCI (Virtual Channel Identifier)=3 or 4 (segment and end-to-end) and VP (Virtual Path) switched compose the F4 (VPC (Virtual Path Connection)) OAM Flow. Cells with PTI (Payload Type Identifier)=4 or 5 (segment and end-to-end) and VC switched compose the F5 (VCC (Virtual Channel Connection)) OAM Flow.

Ingress F4/F5 OAM Flow cells with an OAM Cell Type=0001 (Fault Management) and a Function Type=0000, 0001 or 1000 (AIS, FERF, Loopback) are extracted from the cell stream and redirected using a predefined Header. These cells are the one that are processed by the centralized OAM processor.

A suitable centralized OAM processing resource is a CCM (Control Complex Module), which is responsible for providing OAM support to all UCS (Universal Card Slot) modules. The UCS modules direct the required ingress OAM cells [VC AIS (Virtual Channel Alarm Indication Signal), VC FERF(Virtual Channel Far End Receiver Failure), VP AIS (Virtual Path Alarm Indication Signal), VP FERF (Virtual Path Far End Receiver Failure), Segment Loopback, End-to-End Loopback] to the CCM. The CCM generates the required egress OAM cells.

Prior art ATM switches that implement UPC (Usage parameter Control), ATM address translation or other enhanced functionality at high-speed (155 mbps or greater) ingress or egress ports require a dedicated microprocessor to update port specific parameters located in a dual-port/shared memory system. These parameters may include new VPI/VCIs's, proprietary switch headers, UPC parameters, statistics and connection validity. When a cell arrives at the ingress or egress port, a hardware (H/W) engine then uses these parameters to process the cell appropriately.

The drawback to this approach is that additional cost and complexity (PCB area, addition components, shared RAM systems) is required to implement the enhanced functionality. This additional cost hinders the ability to make a cost competitive, full featured, multi-port switch.

Enhanced functionality is added to the H/W cell processing engine to eliminate the need for the additional processor and shared memory system. To do this, the data and control streams are amalgamated and the H/W cell processing engine is designed to interpret the control cells. This updates the RAM as required to configure ingress and egress connections, and sends responses to status requests. This can be achieved providing a Field Programmable Gate array, such as one available from Xilinx corporation, in the cell processing engine. The cell processing engine then can interpret the control cells.

An additional benefit of this approach is a reduction in the bandwidth requirement of the RAM system. Existing implementations require high-speed SRAM to implement the shared memory system. By eliminating the requirement to provide additional accesses by the external microprocessor, the RAM bandwidth may be reduced significantly.

This technology may be used by any ATM switch. In addition, this approach can be used by any line card in a switch environment requiring frequent parameter updates.

Returning now to FIG. 1, the ATM switches 1a, 1b, 1c are connected to the respective ridges 6a, 6b, 6c. In one embodiment, each ridge 6 has twelve Ethernet ports 7 for connection to an Ethernet LAN, Ethernet adapters of a local workstation 8, a conventional router 9, Hub 10 or bridge 11.

The ridges 6 carry out the bridging, network-layer forwarding and LAN emulation functions to permit transparent communication between any of the user devices over the ATM network. The ridges permit the devices designed to communicate in the LAN environment via the ATM environment.

In fact the ridges carry out six basic steps as follows:
(1) Source Address Validation
    When a packet arrives on a ridge LAN port, the ridge verifies that it has seen the source MAC address on the port before. If the address is found in the source address table for the port, the packet proceeds to Destination Identification.
    If the address is not found, a new station has entered the system, and the packet is forwarded to the Route Server for processing.
(2) Destination Identification
    Once the Ridge has validated the source address of the packet, it examines the destination MAC address of the packet. Several possibilities can occur at this point:
    The packet is addressed to a broadcast address, or to a MAC address that is not in the Ridges's destination address table. The packet is forwarded to the Route Server for processing.
    The packet is addressed to the MAC address of the VIVID "router" itself. This implies that the packet is to be forwarded, so the network layer address of the packet is examined. If the network layer address is in the destination address table, forwarding information is retrieved from the table, and the packet proceeds to the Filtering stage. Otherwise, the packet is sent to the Route Server.
    The packet is addressed to a MAC address that is in the Ridges's destination address table. In this case, the packet can be bridged, so the forwarding information is retrieved from the table, and the packet proceeds to the Filtering stage.
    The purpose of this step is to map the logical destination address in the lookup table to a physical address for the output media. The forwarding information retrieved from the destination address table therefore depends upon how and to where the packet is being forwarded. If the destination is attached to a port on the Ridge, and the packet is being MAC layer forwarded, the destination port ID is retrieved from the table. If the destination is attached to a port on the Ridge, and the packet is being network-layer forwarded, the destination port ID, and the MAC address of the destination are retrieved. Finally, if the destination is located on another Ridge, only the ATM address of the egress Ridge is retrieved from the table.
    The physical-to-logical connectivity mapping is performed at this point by associating a geographically based physical layer ATM address with the logical network layer destination address within the packet.
(3) Filtering
    After the source and destination addresses of the packet are verified, the Ridge checks to see if the devices are allowed to talk to each other. Generally, this is simply a check of source address, destination address, and protocol type, although it may be necessary to look deeper into the packet to perform application-level filtering when required. If the devices are not allowed to communicate, the packet is dropped. Otherwise, the packet proceeds to the Transformation stage.
(4) Transformation
    If the packet entered the system through a LAN port, and is being network layer forwarded, the Ethernet, or 802.3 encapsulation is removed, along with the source and destination MAC addresses in the packet, and the time-to-live for the packet is decremented. The packet is then encapsulated as a routed pdu, to travel over the ATM fabric.
    When the packet is forwarded on a Ridge port, the source MAC address of the packet is set to the MAC address of the VIVID "router". The destination MAC address is set to the value that was retrieved from the destination address table during Destination Identification. Then, the packet is encapsulated in the appropriate format for the LAN.

(5) Call Setup

If the packet is to be forwarded over the ATM fabric, the Ridge checks to see if it has an SVC to the egress Ridge. If an SVC has not already been established, a call is originated to the egress Ridge, using the ATM address that was obtained during Destination Identification.

(6) Transmission

The packet is transmitted on the Ridge egress port, or fragmented into ATM cells and sent out over an SVC to the egress ridge.

Each ridge 6 therefore provides media-rate interconnection between a traditional Local Area Network (LAN) (e.g., Ethernet/802.3, Token Ring/802.5, Fiber Distributed Data Interface (FDDI), etc.) and the Asynchronous Transfer Mode (ATM) wide area network.

The ridges 6 may be considered a 178,560 pps switching and concentration element. The functions performed by the ridge are, more specifically, a) ATM layer segmentation and re-assembly, b) ATM Adaptation Layer 5 (AAL5), c) encapsulation and de-encapsulation of frames in RFC 1483 headers, d) derivation of an ATM address and/or VPI/VCI from the header of a frame, e) Ethernet bridging or network-layer forwarding of frames, f) fragmentation of IP frames received on the ATM port, and g) Transmission Convergence sublayer processing compliant with SONET STS-3c.

As will be described in more detail below, on the Ethernet interface the ridge encapsulates the received cells and sends them into the ATM network toward their destinations. On the ATM interface, the ridge encapsulates cells destined for its attached Ethernet hosts before sending them over the Ethernet to their destinations.

Figure 2:
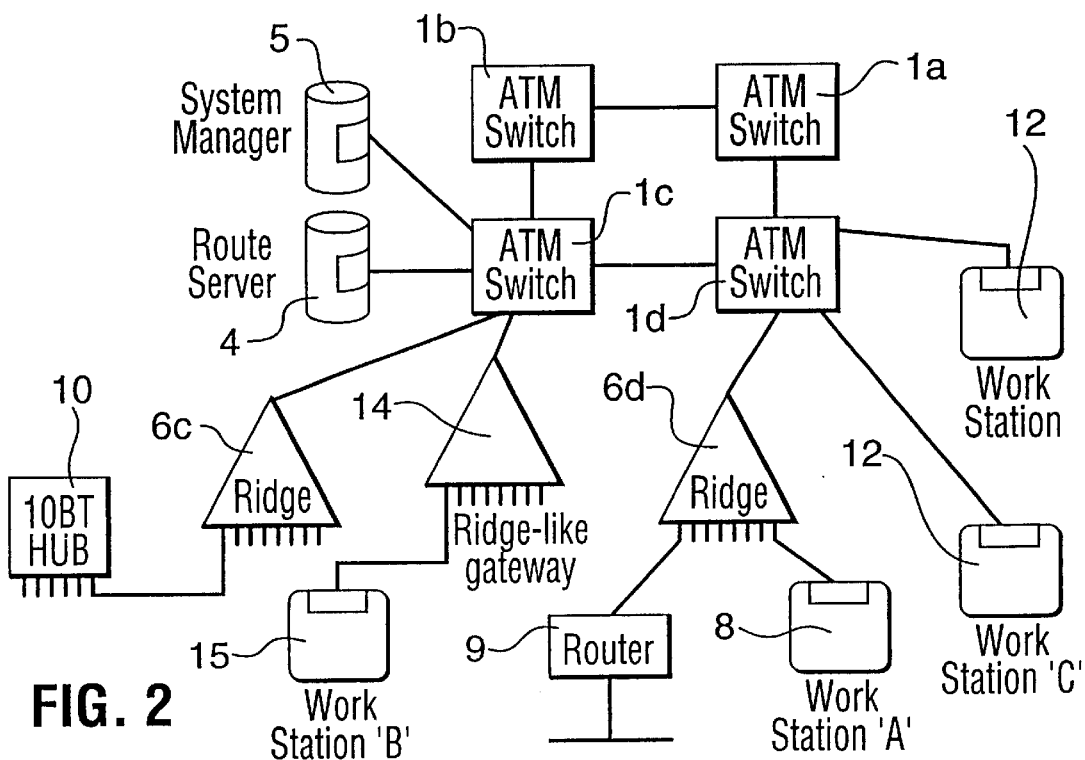
FIG. 2 is a block diagram of a wide area network operating in accordance with a second embodiment of the invention.

FIG. 2 shows an alternative arrangement, in which like parts are referenced with like reference numerals. In FIG. 2, ATM switch 1c, as well as being connected to ridge 6c, is connected to ridge-like gateway 14, which in turn is connected to workstation 15. Gateway 14, instead of converting ATM cells to Ethernet format, and vice versa, encapsulates the incoming ATM cells in Ethernet frames, thus allowing them to be received directly by the Ethernet adapters in the local workstations with the aid of Ethernet drivers.

To achieve fairness without contention, a management information frame is transmitted by the ridge and to the attached Ethernet hosts. When a host receives a management information frame, it transmits data on the virtual circuit(s) indicated in the management information frame, and in accordance with the bandwidth parameters associated with the virtual channel when it was initialized. In this way the ridge and host(s) are synchronized so that each host gets a specified amount of bandwidth without contention or collision.

Figure 3:
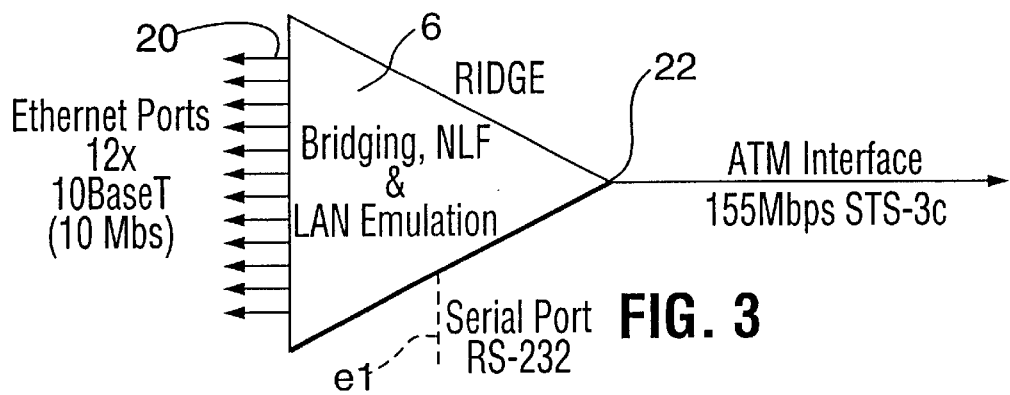
FIG. 3 is a diagram illustrating the function of a ridge.

Referring now to FIG. 3, the ridge 6 illustrated has twelve 10 Mbps (10 baseT) Ethernet ports 20 for connection to Ethernet devices, a single RS-232 serial port 21, and a 55 Mbps one OC-3 over Multi-Mode Fiber ATM port interface port 22. As indicated above the ridge 6 performs bridging, LAN emulation and network layer forwarding functions. Both user data and control traffic (to and from the route server and System Manager) are carried on the ATM interface.

The function of the ridge 6 is to perform Ethernet bridging, network-layer forwarding and LAN emulation for 12 Ethernet ports and a single ATM port. Traffic bound between Ethernets may be either bridged or network-layer forwarded directly; when the ATM port is required for traffic to other ridges, encapsulation and ATM-layer processing is performed.

Figure 4:
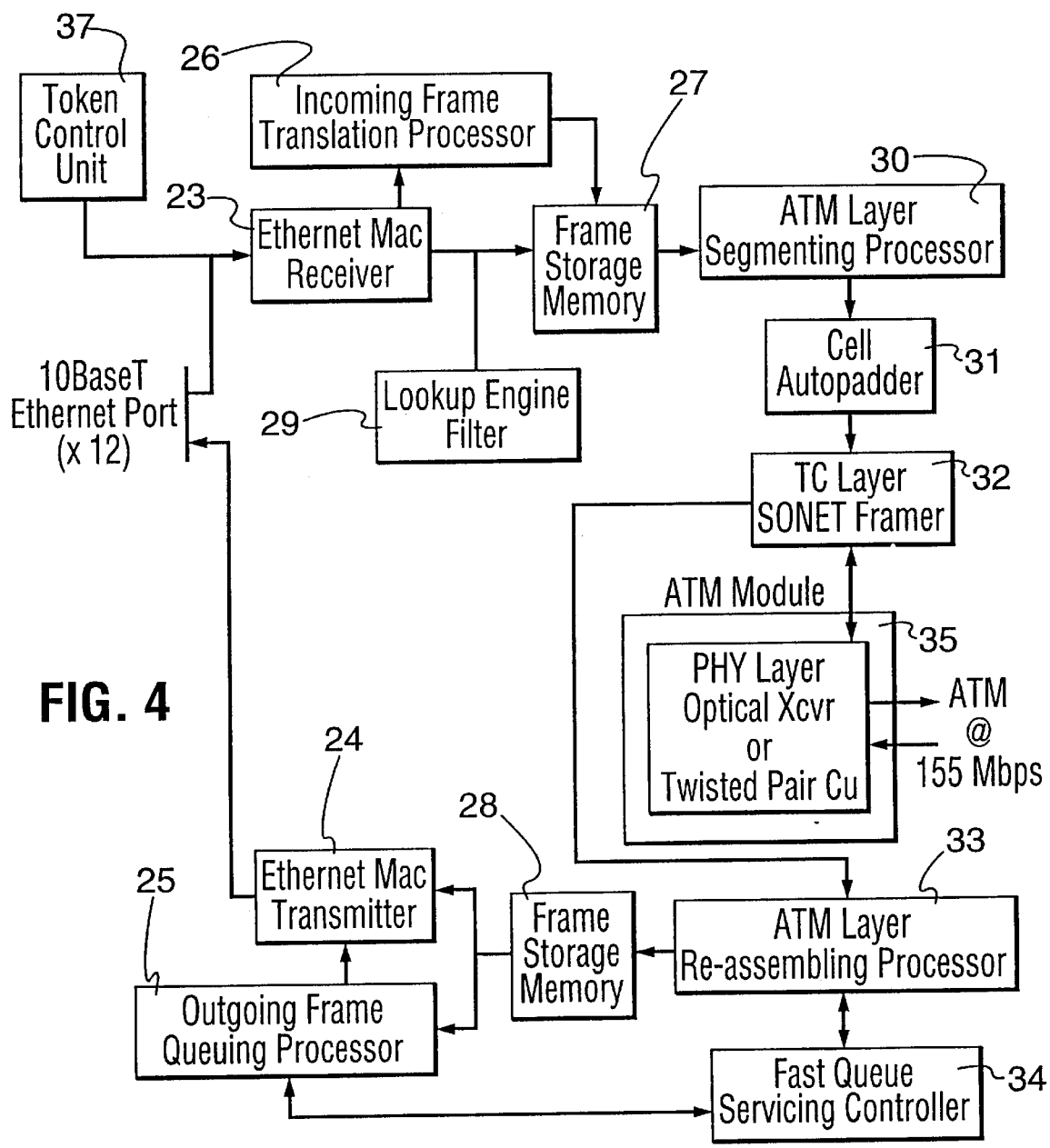
FIG. 4 is a block diagram showing the internal operation the of the ridge in more detail.

Referring now to FIG. 4, which is a more detailed block diagram, the ridge 6 comprises Ethernet MAC receiver 23 and transmitter 24, outgoing frame processor 25, incoming frame processor 26, incoming and outgoing frame storage memories 27, 28, look-up engine filter 29 (illustrated in FIG. 9 and described more fully in our co-pending application No. PCT/CA94/00695, filed Dec. 22, 1994 and entiled Look-up Engine for Packet-Based Network), ATM layer segmenting processor 30, cell autopadder 31, TC layer SONET framer 32, ATM layer re-assembling processor 33, and fast queue servicing controller 34. TC layer SONET framer is connected to ATM module 35 providing the ATM interface 22 for connection over optical fiber or twisted pair copper wire.

The purpose of the fast queue servicing controller 34 is to enqueue on an output queue packets destined for Ethernet ports. There is an output queue for each port. When a queue is serviced, the packet is transferred to the Ethernet MAC port, which must be ready to accept the packet. All queues have equal priority.

In the fast queue servicing controller 34, the availability of ports and data is factored into the request for the next port. Port availability is presented as a bit mask in the address. A priority encoded with round robin priority ensures that if the current queue (as defined by the round robin) cannot be serviced (because either the port or data is not available) then the next highest priority port with all the requirements satisfied is returned. This device always therefore returns a useful result. With the address mapped bit map of useful data, the result can be returned with just one read operation, thereby improving performance.

The fast queue servicing controller 34 can in fact be applied to any set of parallel queues that require servicing, and it is not limited to a round-robin servicing mechanism, but can also be implemented where unequal priorities are associated with the queues.

Figure 5:
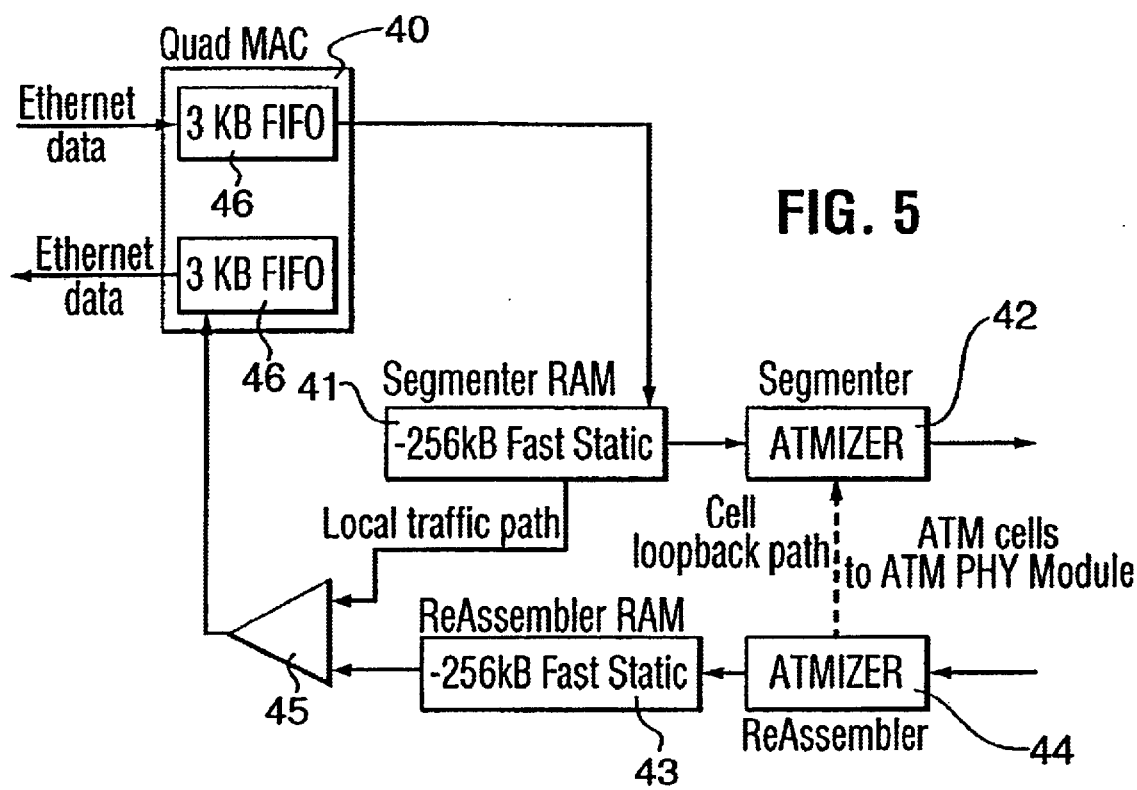
FIG. 5 shows the general traffic flow in the ridge.

The traffic flow in a ridge 6 is shown in FIG. 5. The ridge 6 is designed for separate data paths in the receive and transmit directions. The only exception is locally switched Ethernet traffic, which is routed through the Segmenter RAM system via bypass unit 45. This approach eases the requirement for a single memory system which would quickly become the system bottleneck.

Quad MAC 40 providing transmitter 24 and receiver 23 in FIG. 4 has 3 Kb input and output FIFOs 46, connected to segmenter RAM 41 and segmenter 42 in the ATM direction side and re-assembler RAM 43 and re-assembler 44 on the Ethernet side input. Bypass unit 45 allows incoming Ethernet traffic to bypass the ATM network and pass directly to the output of Quad MAC 40.

Figure 6:
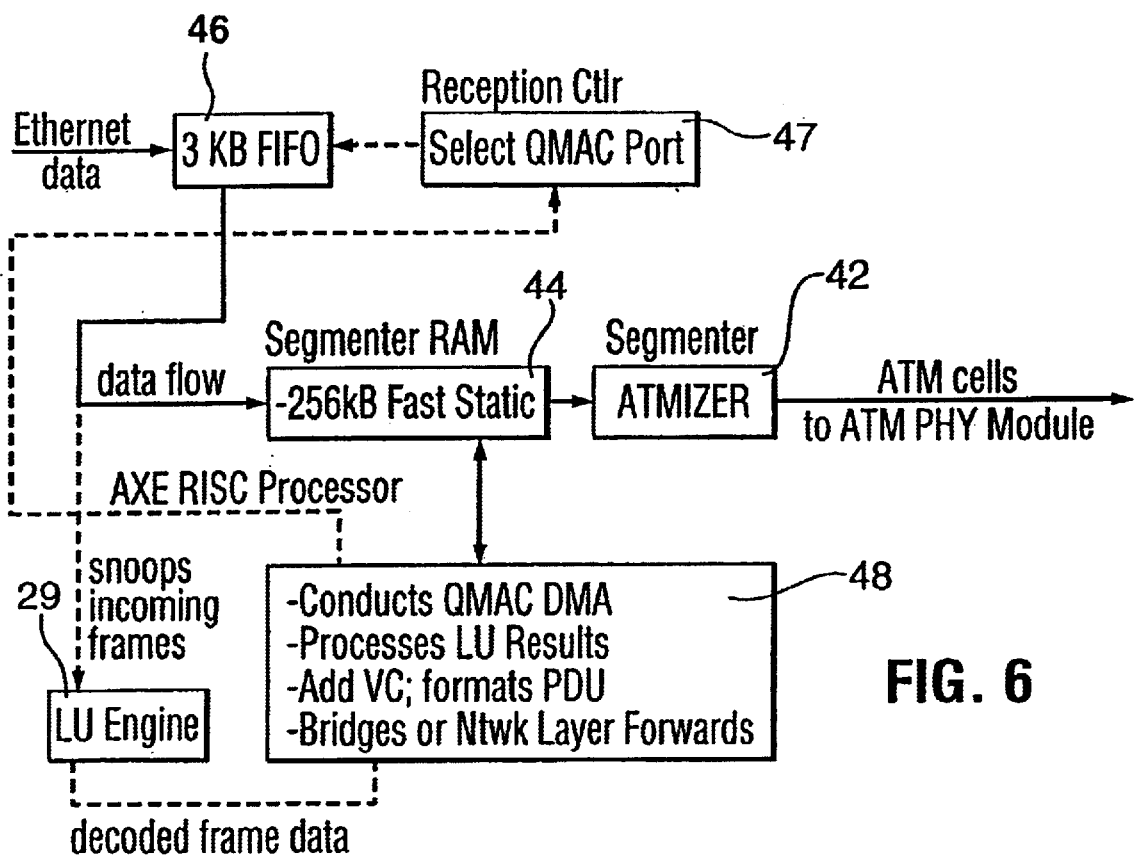
FIG. 6 shows the traffic flow in the Ethernet-ATM direction for the ridge.

FIG. 6 shows in more detail the packet flow in the ATM direction. First the Ethernet frames are buffered in their entirety inside the Quad MAC ASIC FIFO 46, then the QMAC 40 notifies the AXE RISC processor 48 via Reception Controller 47 that a DMA is required. The AXE (Transfer Engine) 48 initiates DMA to Segmenter RAM without taking into consideration which port is selected, and the Reception Controller 47 selects the port using a round-robin priority scheme.

The Look-up Engine 29, referred to above and described in our co-pending application then snoops and loads the frame header information (See FIG. 9) in "fly by" mode and starts context searching for source, destination MAC address, protocol type, port group, etc. As shown in FIG. 6, the decoded frame data are sent to the Transfer engine (Axe) 48.

The AXE 48 takes the look-up results, and may drop the packet or perform a network-layer transformation if instructed. It then reformats the packet as required into a CS-PDU and notifies the Segmenter 42 to start cell slicing. Segmenter performs ATM segmentation and returns the buffer when complete.

The AXE 48 is a 50 MHz R3000 RISC engine, with an integral high speed DMA and a separate, secondary processor bus. In order to maintain media speed performance, it must complete the tasks described below in 5.6 us (280 cycles). The AXE 48 keeps the DMA data flowing between the QMACs and Segmenter RAM in the foreground, moving about 512 bytes at a time; there is no interleaving of ports once a packet DMA has begun. In the background, packet information is retrieved from the LUE FIFO, and AXE packet processing begins.

The packet is either discarded, bridged or network layer forwarded. For bridged packets no packet modification is performed.

For network layer forwarded packets, fields in the network layer payload header of the packet are modified; in the IP case, for example, the TTL is decremented and the checksum adjusted. The new destination MAC address is appended to the packet descriptor for insertion by the Transmit Controller. The processing at this stage is protocol dependent.

The packet is encapsulated in RFC 1483 type LLC encapsulation for ATM Adaptation Layer 5

The VC is inserted from the LUE 29.

The frame is queued to the Segmenter for ATM or local transmission.

Figure 8:
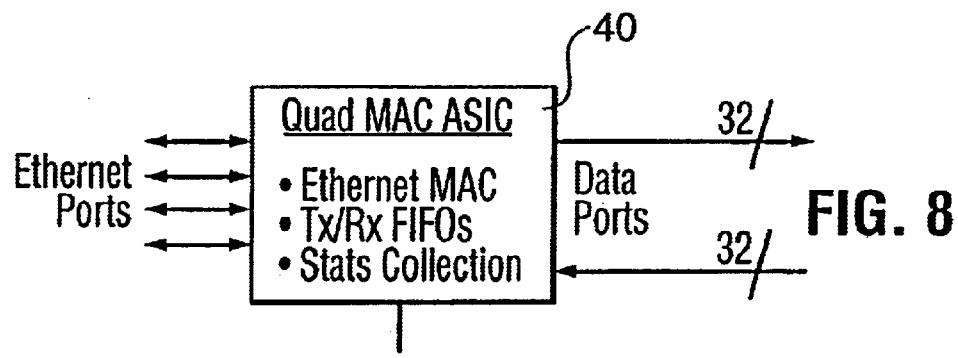
FIG. 8 shows a QMAC in more detail.

Ridge Host Processor originated traffic simply appears as a "13th port" to the rest of the ridge (FIG. 8). Part of the Host Processor complex includes a FIFO interface which mimics the Quad MAC 40.

Figure 7:
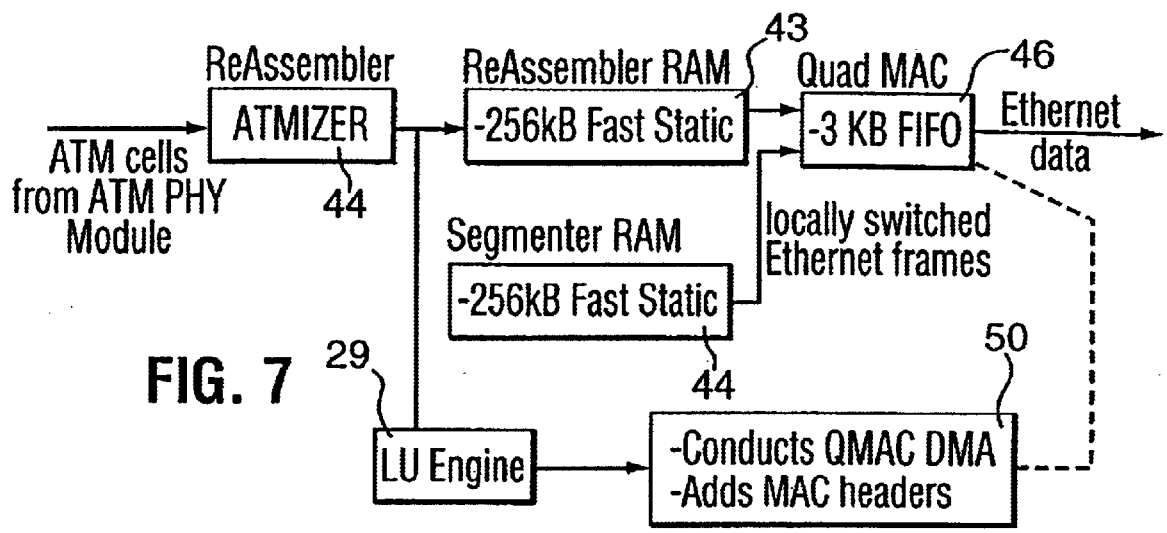
FIG. 7 shows the traffic flow in the ATM-Ethernet direction for the ridge.

Data flows out of the Ethernet ports in a symmetrical path to that of the previous description as shown in FIG. 7, which shows data flow in the ATM-Ethernet direction. This is similar to that described in FIG. 6 except that transmit control processor 50 conducts QMAC Direct Memory Access and adds MAC headers.

The Transmit Controller 50 is functionally similar to the AXE 48, as packets are dequeued from the Segmenter and Reassembler RAMs, MAC addresses are inserted, and they are DMA'd to the Quad MACs. Like the AXE, the TXC is implemented with a 50 MHZ R3000-based RISC processor, and must complete its processing in 5.6 $\mu$s.

There are three sources of Ethernet packets transmitted from the ridge: ATM cells, local inter-port traffic, and local Host-processor originated. In the latter two instances, the frames are in Segmenter memory rather than Reassembler memory. As such, the Transmit Controller 50 must deal with two traffic sources to feed the QMACs 40.

The packet flow from the Reassembler is as follows:

1) The ATM cells are reassembled into Reassembler RAM;

2) The Reassembler DMAs the packet header into the LUE, which determines the source and destination MAC addresses, as well as the outgoing portset. The information is appended to the frame for use by the Transmit Controller;

3) The frame is queued to the Transmit Controller by the Reassembler.

The packet flow from the Segmenter memory system simply involves the Segmenter queuing frames to the Transmit Controller 50. After the Transmit Controller RISC processor is notified of the arrival of frames via the ATM or local switching paths, it inserts the MAC addresses and conducts the DMA out to the appropriate port of the Quad MAC.

Figure 9:
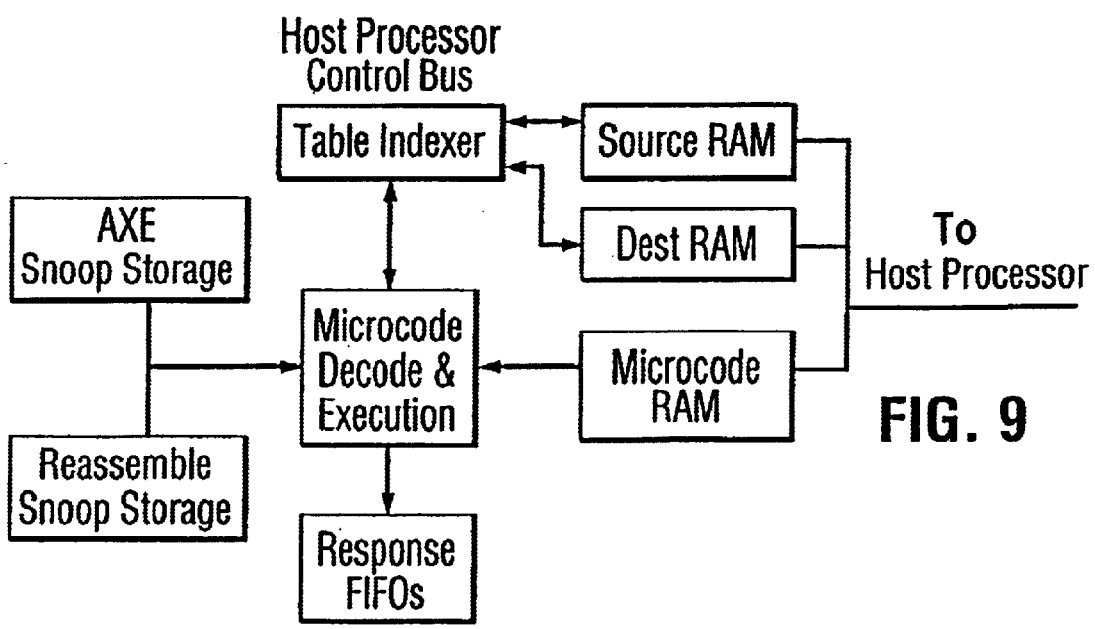
FIG. 9 is a block diagram of a look-up engine.

The QMAC 40 is shown in more detail in FIG. 8. This comprises an ASIC which streams four ports of Ethernet traffic to and from high speed, 32 bit wide synchronous data buses; an external DMA is required. The QMAC 40 features integral 10 BaseT or AUI transceivers, a full compliment of packet and byte counters, and an internal 3 k packet buffer in each direction The look-up engine 29 is shown in FIG. 9 and described in our co-pending application referred to above. The lookup engine (LUE) is used each time a packet is received off the Ethernet or the ATM network. The type of information that the engine provides, which is held in a look-up table, depends on the direction of packet flow and the type of packet. The LUE will provide all the information needed to find the path to each known destination, as well as provide default information in the case of unknown destinations. The default information in most cases will direct the packet towards the route server.

The LUE 29 is based on table lookups using nibble indexing on variable portions of the packet, such as MAC and network layer addresses, and bit pattern recognition on fixed portions for network layer protocol determination. Each lookup table is organized into a hexadecimal search tree. Each search tree begins with a 16 word root table. The search key (e.g. MAC address) is divided into nibbles which are used as indices to subsequent tables. The 16 bit entry in the table is concatenated with the next 4 bit nibble to form the 20 bit address of the next 16 word table. The final leaf entries point to the desired information. A block diagram of the LUE is shown below:

Bit pattern recognition is achieved by a microcode instruction set. The microcoded engine has the ability to compare fields in a packet to preprogrammed constants and perform branches and index increments in a single instruction typically. The microcode engine has complete control over the search algorithm, so it can be tailored to specific lookup functions, and microcode is downloaded as new functions are required. The output of the microcoded engine packet parsing is an index which the AXE can use to rapidly vector to a processing routine.

Learning and aging of source addresses requires tree manipulation, and is accomplished as a background task with the help of the AXE and Host Processor. Newly discovered source MAC frames result in an internal message forwarded to the Host Processor, requesting parameters be added to the LUE Source RAM. The Host Processor then accesses the LUE RAM through and re-arranges the tree as required.

The LUE is physically partitioned into a large FPGA, separate source and destination lookup memories of 512 k kB and 1 MB respectively, a downloadable microcode RAM, and a combination of Xilinx and FIFO devices to interface to the RISC processors.

To ease the design requirements of a single, superfast memory system required for Segmentation, Reassembly, and QMAC traffic, the ATM SAR function is split in two by the ridge. As such, the architecture is horizontally divided by direction, and is truly a full duplex system.

The Segmenter complex consists of an ATMizer, an interface into the Segmenter RAM on its primary bus, some additional high speed pointer memory on its secondary bus, and a memory to the Reassembler. The latter is used as a SAR communication buffer for OAM and lightweight switching support.

A dedicated ATMizer is used to implement ATM reassembly in the ridge of up to 1024 simultaneous VCs. As packets are reassembled, the LUE snoops the incoming first cell, and provides the destination MAC address if it's a routed PDU (the source MAC is automatically the route server). The MAC is appended to the packet by the Reassembler for quick insertion by the Transmit Controller.

Cells may be passed from the Reassembler to the Segmenter using an inter-ATMizer cell link. This is useful for loopback diagnostics.

The Segmenter and Reassembler RAMs are similar in function, and provide the intermediate CS-PDU buffering between the ATM and LAN environments. The Segmenter memory has 4 ports: the AXE Secondary bus, the Quad MAC (AXE Primary bus), the Transmit Controller and Segmenter. The Reassembler memory has 3 ports: the Transmit Controller, and both the Primary and Secondary buses of the Reassembler. Both are 512 kB in size.

Each RAM system has a similar arbitration controller, and services access requests one at a time in a round-robin fashion. The arbiter allows addresses to accumulate behind buffers such that switch-over time between interfaces is minimized. Currently the memory systems use high speed 15 ns RAMs to achieve 3 cycles for arbitration and 4–5 cycles for write and reads, respectively. The RAM systems provide over 800 Mbps in sustained bandwidth.

The ridge requires a supervisory Host processor to handle system startup, power-on diagnostics; downloading of LUE and RISC processors; run Spanning Tree algorithm; perform network management (SNMP, 4602 I/F); perform local serial port configuration; connection management (Q.2931); perform "learning" and table maintenance for the LUE; run PHY module state code if necessary (OC3); and control faceplate LEDs The Host processor complex is realized with a 6 MIP MC68349 CPU operating at 25 MHz, with the following peripherals: 2 MB RAM; two banks of 1 Mbyte Flash EPROM (Intel based); 32 KB Battery backed NVM (Non-volatile Memory); 2 KB FIFOs in each direction for packet transmission; ATMizer serial downloader; and RS-232 transceiver for local serial port configuration.

A 5-processor pipelined architecture like the ridge can be expected to have significant data-passing requirements; there are essentially three, as described in the following sections.

The Host Processor needs to pass configuration, maintenance, and statistics polling packet messages to each of the ATMizers, as well as communicate with external Ethernet-based devices. To streamline these two requirements, the Host Processor appears as a "13th port" in line with the QMACs to the AXE and Transmit Controller. Frames destined for internal processors are flagged and loaded into the Segmenter memory by the AXE, in much the same way as regular traffic. To get to the Reassembler, a message packet must be physically recopied by the Transmit Controller into Reassembler memory.

In the other direction, the Transmit Controller differentiates between local messaging and MAC-addressed traffic destined for the Host by prepending a flag to the packet. The Host processor uses its integral DMA controller to move data to/from its QMAC-emulation FIFOs.

As buffer pointers are passed between the ridge ATMizers, a simple interrupt flag is used to signal their requirement for service. At the same time, the "CPCond" input is set, such that a single R3000 branch instruction can efficiently poll and vector on the flag in a single cycle.

The Segmenter receives an interrupt from the AXE indicating the arrival of a data buffer.

The TXC receives an interrupt from the Segmenter and Reassembler indicating the arrival of a data buffer.

The Segmenter and Reassembler interrupt each other to service their memory queues.

The Segmenter and Reassembler need a direct communication path for bi-directional protocols such as lightweight switching and ATM OAM. This is provided by a small memory, and the capability to interrupt each other.

Figure 10:
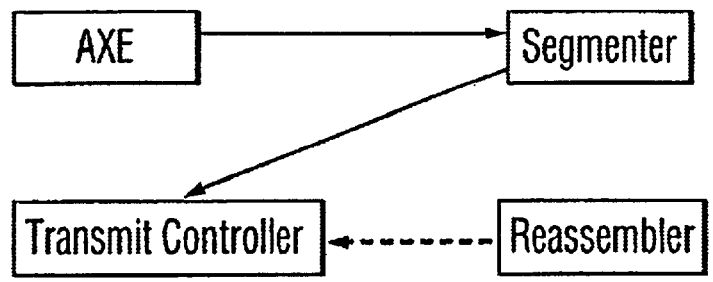
FIG. 10 is a diagram showing buffer flow in the ridge.

With four processors moving data around the ridge, an optimal scheme for passing buffer pointers and returning free ones is essential. With the multiporting of Segmenter and Reassembler memories, no actual copying of data is necessary. For simplicity and low cost, buffer pointers are passed through the multiported memories in the same path as the data. To avoid complexity in the returning of buffers, they are passed in a unidirectional manner, as shown in FIG. 10.

Packets received by the AXE are forwarded to the Segmenter, whether they are destined for the ATM network or not. In the case of local traffic, the Segmenter will requeue the packet to the Transmit Controller, which means that the returned free buffer list is managed by a single processor. This avoids re-entrance problems and simplifies overall buffer management.

Data buffers received by the Reassembler can simply be passed to the Transmit Controller for Ethernet transmission and returned when the DMA is complete.

Statistics are collected by a combination of hardware and software in the ridge, depending on the application. The Quad MACs have hardware counters for:

Number of frames sent/received

Number of bytes sent/received

Ethernet reception errors (CRC, alignment, runt)

Number of collisions

Number of failed transmissions due to >16 collisions

Other statistics are gathered by ATMizers for reporting via the Host Processor. Examples of these are:

Number of cells sent/received

Number of security violations/port

Figure 11:
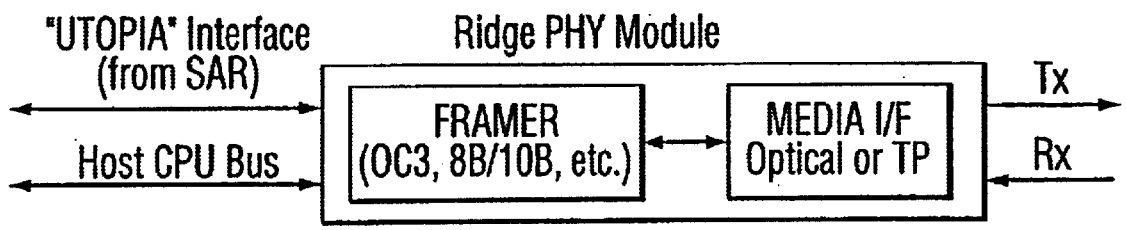
FIG. 11 is a block diagram of a PHY module.

The ridge PHY module addresses the current debate over physical interface types by making it easily changeable. This is shown in more detail in FIG. 11.

The ridges are therefore a key element of the system, concentrating 12 Ethernet ports with local switching onto a single ATM trunk for connection to an ATM switch. The particular embodiment of the ridge described features: 12 10 BaseT Ethernet ports; one Modular ATM port (first release: 155 Mbps STS-3c over Multimode fiber optic cable); Full media-speed bridging and network-layer forwarding between all Ethernet and ATM ports; Broad range of packet filtering capabilities; Supports IP fragmentation in the ATM to Ethernet direction; Manageable using SNMP and standard MIBs; Spanning Tree algorithm; ATM support: AAL5, CLP, OAM, traffic shaping, Newbridge "lightweight switching"; Remote traffic monitoring with Ethernet "snooping" mode; Rack, desktop, or wall mountable in standalone packaging; Local management interface (serial port); Software downloadable using "Flash" memory; "Soft" RISC and ASIC-based design: over 200 MIPS.

The described ridge is thus an ATM LAN emulator designed to marry a routed Ethernet environment to an ATM WAN network with the following features: Low cost; Full media speed- bridging and network layer forwarding; Accommodate standards yet to be defined/invented; Support a full range of filtering capabilities; Understand and take advantage of routed protocol capabilities; Work standalone, or integral to a variety of ATM hubs; Straightforward migration path to ASICs.

Key elements of the ridge are:

High density, fast Ethernet MACs.

Powerful table searching engine. A fundamental aspect of bridges and routers is the ability to quickly associate ports, VCs, MAC addresses, security restrictions, etc., in real time. On the ridge, this necessitates a lookup every 5.6 us into a table holding at least 8,000 MAC entries.

Flexible network layer hardware parser. To perform high speed network layer forwarding, frames need to be rapidly parsed and modified with new MAC addresses, TTL and checksums. A high speed RISC processor actually does the work and is coupled with the table-searching engine to form a frame-processing complex.

Fast, multiported ATM to Ethernet buffering system. As the ridge is a store-and-forward device, and congestion is possible in both directions, the amount of internal buffer storage is a consideration. The memory system must be fast, providing at least 275 Mbps in each direction, relatively large, and low cost. Other important characteristics include efficient arbitration of the RAM systems and low access latency.

A fundamental aspect of the ridge is the repackaging of Ethernet frames, insertion of a VCI, and dissection into 53 byte cells. The reverse process requires simultaneous piecing together of frames, and redirection to the appropriate Ethernet port. The cell size, and ATM processing required, is highly dependent on the target environment.

The "ATMizer" has a 50 MHz R3000 core coupled with internal RAM, caches, DMA and ATM serialization hardware required to process ATM cells in real time.

RISC-based DMA. The ability to move ridge data around at high speed, modifying fields and managing queues, calls for an extremely fast and cost-effective RISC solution. To streamline the development process, and take advantage of a highly optimized integrated solution, the ridge re-uses 2 ATMizers in a non-ATM application to perform rapid data manipulation.

High speed ATM port. Connection to an ATM switch via transmission medium (standalone ridge) or a suitable backplane interface (Stealth in the 36150 switch). As the choice of physical medium and framing scheme is still being actively debated, a swappable PHY module is used for this function.

A relatively low speed processor is required as a Housekeeping Processor for network management, diagnostics, configuration, and overall supervision. In one embodiment, this is a Motorola 68349 microprocessor clocked at 25 MHz.

A further aspect of the invention will be described with reference to FIGS. 15 to 18.

Figure 15:
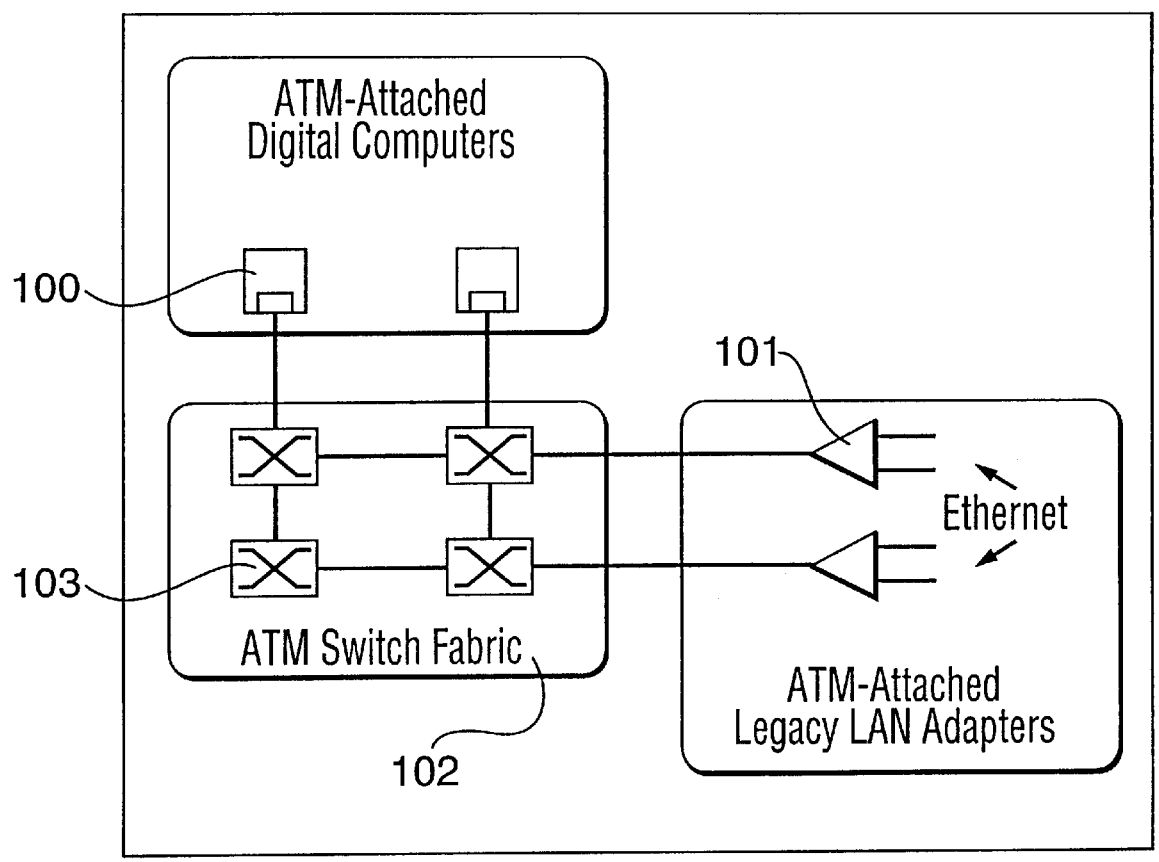
FIG. 15 illustrates a typical example of an interconnected system of Ethernet-attached computers and ATM-attached computers.

In FIG. 15, the ATM attached digital computer and legacy LAN adapters 100, 101 are used to interface legacy Ethernet LANs and digital computers to the ATM switching fabric 102, which may be composed of one or more ATM switches 103. This configuration is used to transport LAN data traffic between the various termination units. However, the benefits of ATM, which include guaranteed bandwidth (BW), traffic management, and so on, are not extended past the legacy LAN adapters to the legacy LAN attached (e.g., Ethernet) digital computers. Thus, it is impossible to use Ethernet, in the traditional carrier sense multiple access with collision detection (CSMA/CD) mode of operation, to provide all the services available to directly attached ATM components (e.g., digital computers), unless a meta level access control mechanism is employed in the legacy LAN environment.

Providing ATM services to an Ethernet-attached end station (digital computer), which is interfaced to the ATM switching fabric via an ATM-attached legacy LAN adapter requires that a connection management, signalling, and bandwidth management mechanisms be provided, which deterministically control access to the Ethernet LAN from all end stations attached to it, and extends ATM Q.2931 signalling to the Ethernet end stations.

The provisioning of full ATM services to Ethernet-attached terminal devices, using digital computers as a specific example of said terminal devices, will now be described.

FIG. 15 illustrates a typical example of an interconnected system of Ethernet-attached digital computers 101 and ATM-attached digital computers 100.

Figure 16:
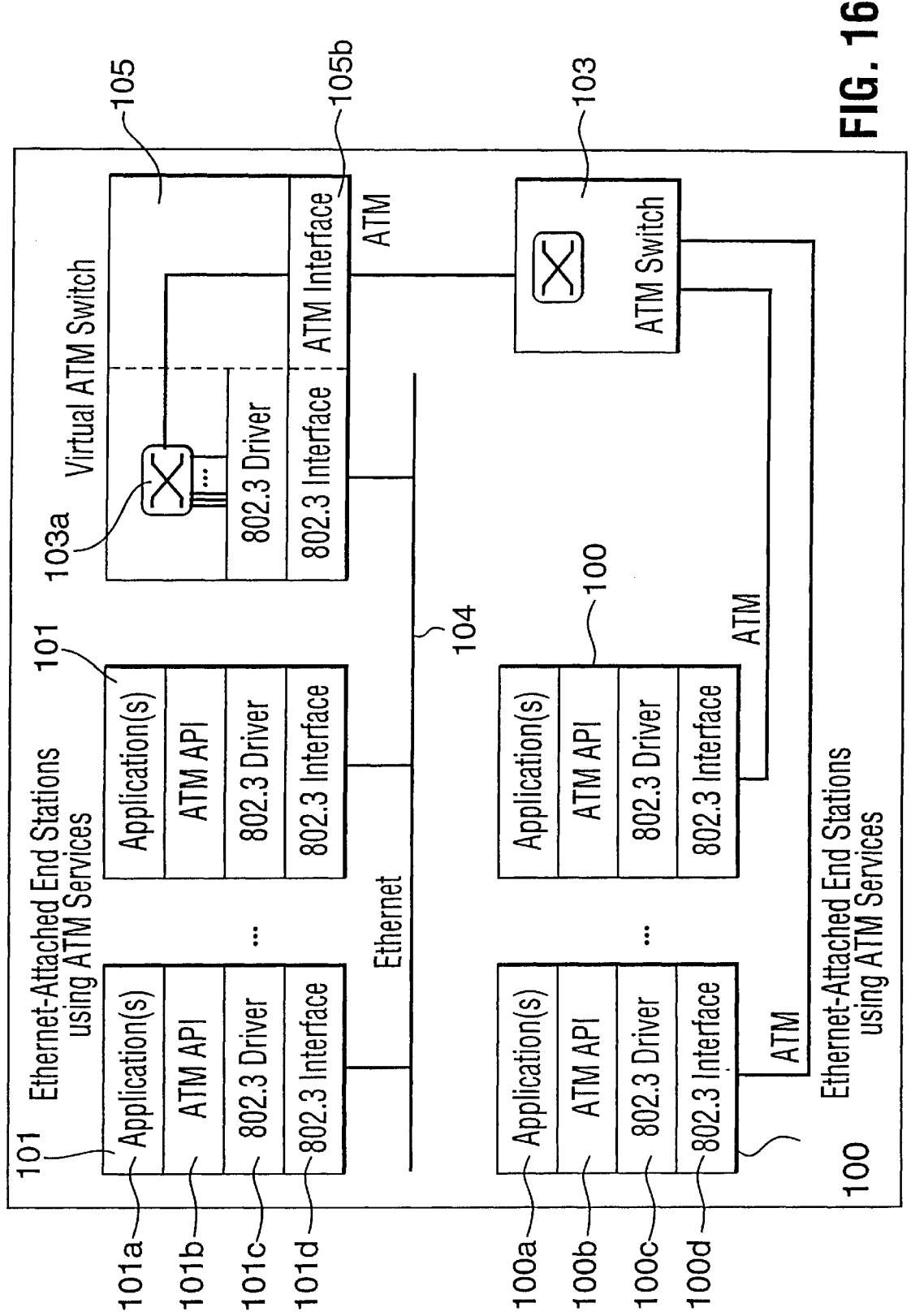
FIG. 16 schematically illustrates the relevant internal features of the layers described in Ethernet-attached end stations using ATM services.

In FIG. 16, the Ethernet-attached consumers of ATM services are depicted as blocks containing four layers: "Application(s)", "ATM API", "802.3 Driver", and "802.3 Interface", respectively 101a, 101b, 101d, each attached to Ethernet backbone 104, which is attached to ATM switch 103 by a virtual ATM switch 105 to be described in more detail below.

The "Application(s)" layer 101a is intended to schematically represent an application, which is layered upon an ATM application program interface (API), which is used to extend ATM services to the application.

Figure 17:
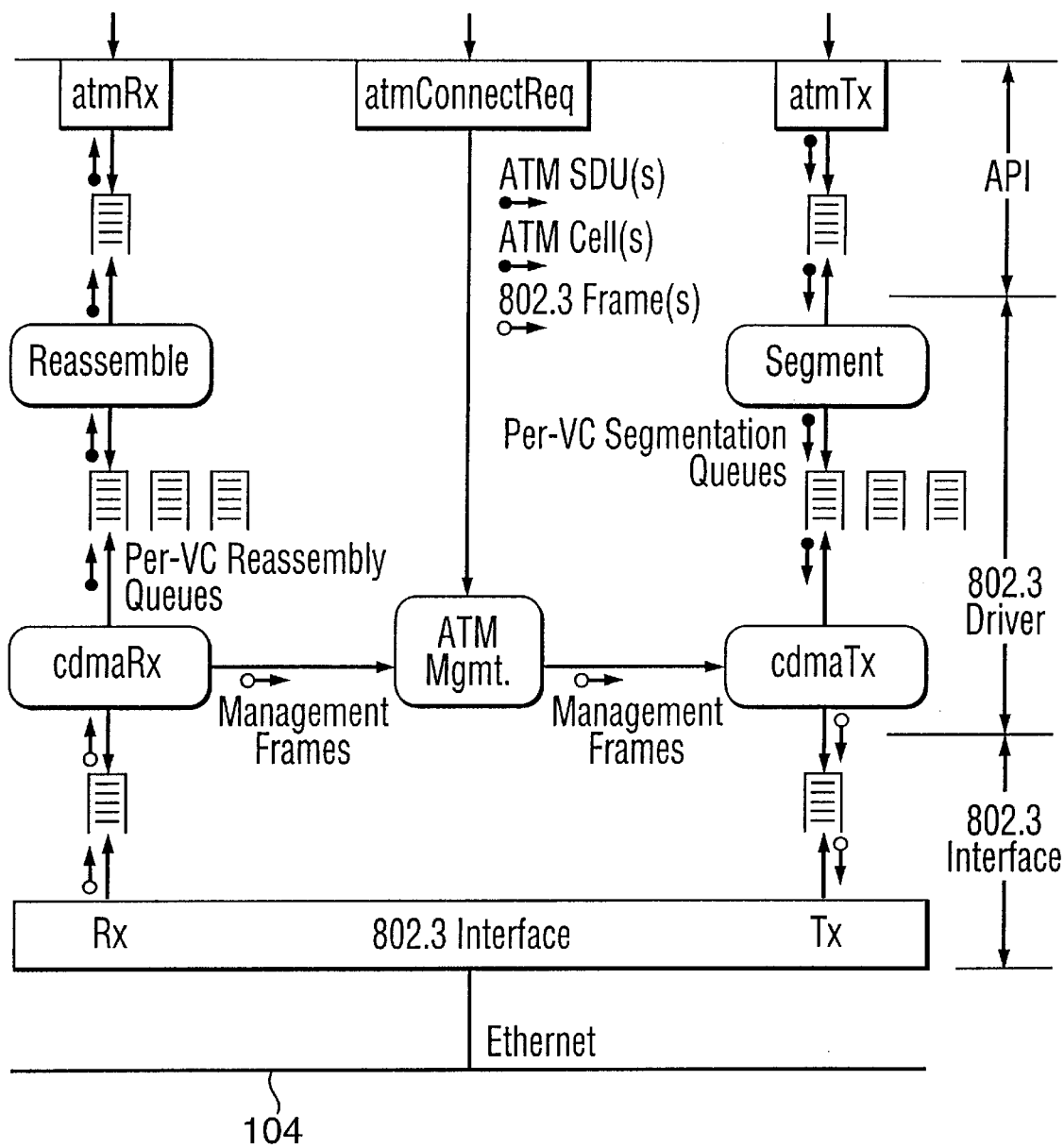
FIG. 17 shows a virtual ATM switch.

The "ATM API" layer 101b is intended to schematically represent a component providing API services to the upper layer consumer, in terms of the lower layer provider, which is the "802.3 Driver" in this figure. Typical services provided by this API includes "atmConnectReq", which is used to request that a connection be established to an ATM endpoint corresponding to an application specified ATM address; "atmTx", which is used to transmit service data units (SDUs) to an ATM end point, over a previously established connection; and "atmRx", which is used to receive SDUs from an ATM end point, over a previously established connection. The top portion of FIG. 17 schematically represents these constructs.

The "802.3 Driver" 101c layer is intended to schematically represent a component which converts SDUs's into ATM cell format, and provides the ATM connection management, bandwidth management, and signalling. This layer is used to create and destroy ATM connections, convert SDUs into ATM cells for transmission, and ATM cells to SDUs for reception, and controls the transmission of ATM cells onto the Ethernet LAN.

The "802.3 Interface" layer is intended to schematically represent the ethernet interface to the ethernet LAN. This interface is used to transmit and receive Ethernet frames.

The ATM-attached consumers of ATM 100 services are similarly depicted as blocks containing four layers: "Application(s)", "ATM API", "ATM Driver", and "ATM Interface", respectively 100a, 100b, 100c, 100d.

The upper layer interface to the "ATM API" 100a provides the same interface to an application residing on an ATM-attached end station as the "ATM API" provides to the ethernet-attached end station deriving ATM services.

The "ATM Driver" layer 100b is intended to schematically represent a component which converts SDUs's into ATM cell format, and provides the ATM connection management, bandwidth management, and signalling. This layer is used to create and destroy ATM connections, convert SDUs into ATM cells for transmission, and ATM cells to SDUs for reception, and controls the transmission of ATM cells into the ATM network.

The "ATM Interface" layer 100c is intended to schematically represent the ATM interface to an ATM network. This interface is used to transmit and receive ATM cells.

In FIG. 16, an ATM switch is represented by an icon resembling an X. Two instances of this icon are present, 103 and 103a. Switch 103 provides direct links to ATM end points. Switch 103a forms part of virtual switch 105, and is layered on top of an "802.3 Driver" layer.

In FIG. 16, there is an implied peer relationship between all the instances of the ATM application(s). In other words, the applications are capable of exchanging information on a peer basis, by utilizing the services made available via the ATM API.

ATM services are extended to the Ethernet-attached end stations, using the ethernet LAN as a virtual port extension to the virtual ATM switch 105. An ethernet host wishing to exchange ATM messages with any other end station connected in FIG. 16 forwards the cells to be transmitted to the ATM virtual switch, which in turn forwards the cells to the appropriate ATM link. It is important to note that even if the ATM end station to which the cells are to be transmitted to is on the same Ethernet segment as the originator of the cells, the cells are still forwarded to the virtual ATM switch first.

The lower portion 105b of the virtual switch 105 can be provided by a ridge as described above.

In order to ensure deterministic access to the Ethernet LAN, any station other than the virtual ATM switch, cannot transmit any data on the LAN segment until it receives a management indication frame from the virtual ATM switch. The management indication frame contains information which specifies which virtual channel connections (VCCs) the Ethernet-attached end station can transmit on. Also, given that the virtual ATM switch is responsible for generating the management indication frames, it meters data to be transmitted from the virtual ATM switch to the Ethernet-attached end stations according to the bandwidth parameters associated with the VCC, when it was initialized.

FIG. 16 schematically represents relevant internal features of the layers described in the Ethernet-attached end stations using ATM services. The right hand side of the figure delineates the layers for reference purposes. An application developed to utilize the ATM services in the Ethernet-attached end station would use the interface points depicted at the top of the ATM API. The ATM API is not exhaustive in terms of the service interfaces shown and previously referred to. A representative subset are shown. FIG. 17 illustrates the data flow from SDUs to ATM cells to Ethernet frames. The data flow of management frames (indications) is also illustrated.

FIG. 17 schematically illustrates the highlights of the virtual ATM switch 105 referred to in FIG. 16.

Figure 18:
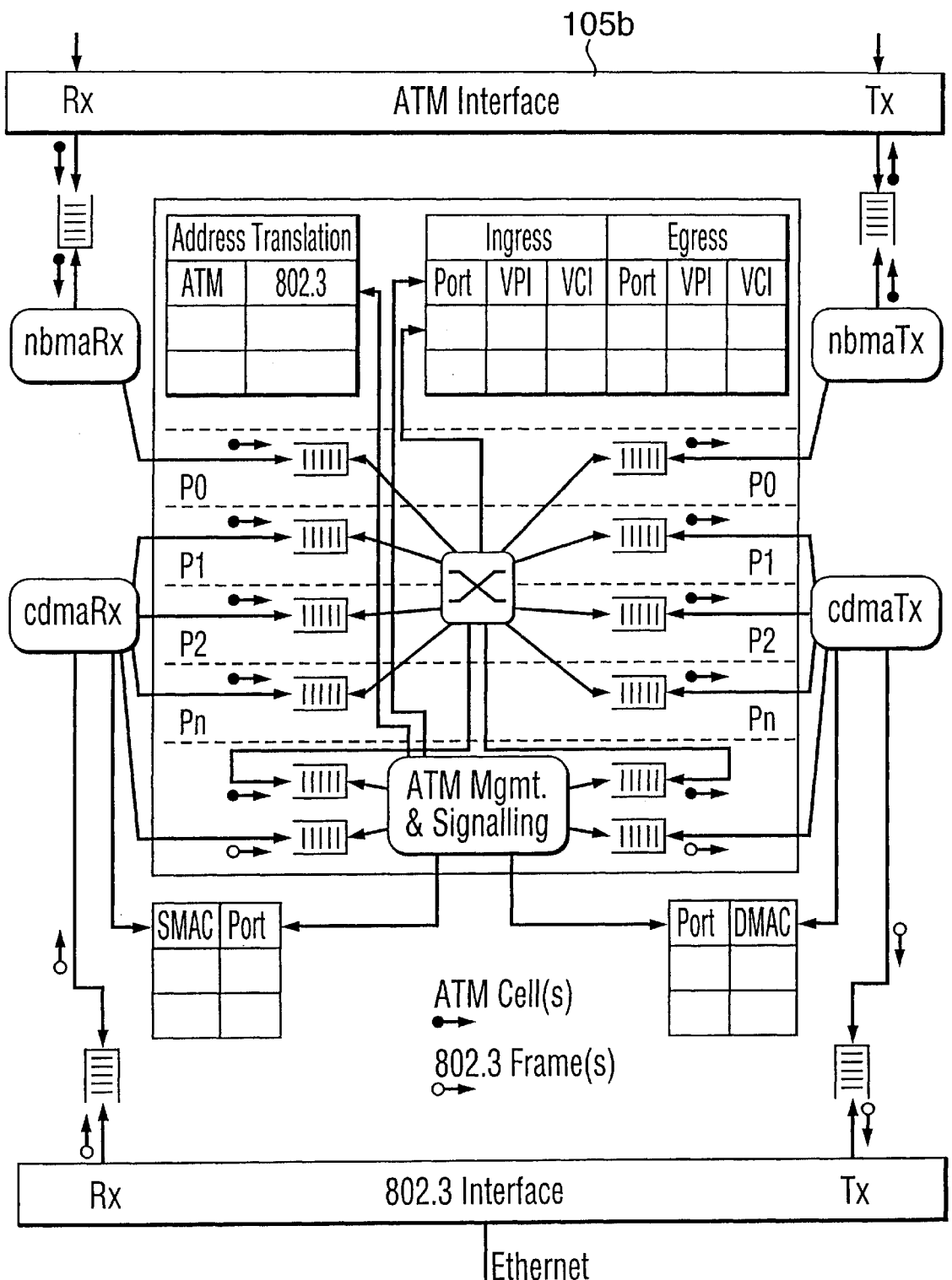
FIG. 18 schematically illustrates details of the virtual ATM switch shown in FIG. 17 in more detail.

FIG. 18 illustrates the centralized bandwidth, call setup, and signalling functions, which are services that are extended to the ethernet-attached end stations desiring ATM services. The Figure also illustrates the cell switching data path, how proxy (virtually extended) services are extended to the Ethernet-attached end stations, via the ATM Mgmt. & Signalling block.

| GLOSSARY | |
|---|---|
| 802.1(d) Transparent Spanning Tree | This is the IEEE standard protocol for routing, loop detection and avoidance in a network of MAC bridges. |
| 802.2 Logical Link Control | This is the IEEE standard for the Data Link Layer of local area networks. Also ISO 8802/2. |
| 802.3 | CSMA/CD LAN. This is the IEEE standardized LAN that is almost identical to Ethernet. It is a bus that uses CSMA/CD for access control. Also standardized as ISO 8802/3. |
| ATM Adaptation Layer. | A protocol used to convert non-ATM information to and from ATM Cells. |
| CPSS Control Packet Switching System | A network protocol for communication between equipment. CPSS is a connection-less, packet-switched protocol used to transfer control and status information between network elements and network management entities. |
| CRC Cyclic Redundancy Check | A type of frame-check sequence. |
| Ethernet | A CSMA/CD local area network developed at Xerox PARC during the late 70's. It is almost the same as the LAN standardized by the IEEE as 802.3. |
| FCS Frame Check Sequence | A checksum routine used to determine errors in the transmission of data packets. |
| FDDI Fibre Distributed Data Interface | An ANSI-standardized 100 Mbits/s local area network. The topology is a ring and uses token passing for access control. |
| HDLC High Level Data Link Control | A family of bit-oriented protocols providing frames of information with address, control and frame check sequence fields. |
| LAN Local Area Network | A system designed to inter-connect computing devices over a restricted geographical area (usually a mile or so). |
| LUE Look Up Engine | A hardware table searching machine. |
| MAC | Media Access Control. The lower sub-layer of the Data Link Layer as described in the ISO Reference Model. The purpose of the MAC layer is to provide a reliable data transfer mechanism across a physical medium. |
| NIC Network Interface Card | An adapter board that can be added, usually by the user, to a workstation or PC in order to provided connectivity to a network, e.g., LAN or ATM. |
| OAM Cell Operations and Maintenance Cell | A specially tagged ATM cell (e.g. the header is different from the header for a user data ATM cell). OAM cells are specified to support ATM network maintenance features like Connectivity Verification, Alarm Surveillance, Continuity Check, and Performance Monitoring. |

GLOSSARY

| | |
|---|---|
| OSPF Open Shortest Path First | An IETF standard link-state routing protocol used for route determination in IP networks. |
| PVC Permanent Virtual Channel | An end-to-end logical ATM connection, of either the Virtual Channel or Virtual Path kind, established through administrative actions. |
| SNMP Simple Network Management Protocol | A standard for the management of entities in a TCP/IP local area network. There are two versions: the original (called SNMPv1) and a newer extended version (called SNMPv2). |
| SAR | Segmentation and Reassembly. The process of breaking non-ATM offered payloads into ATM cells (segmentation) and reconstructing ATM cells back into the circuit's native format (reassembly) |
| SVC | Switched Virtual Channel. A virtual channel that is established through signaling. |
| TCP | Transmission Control Protocol. The Transport Layer (roughly) protocol for the TCP/IP protocol suite. Defined in RFC 793. |
| TXC | Transmit Controller. A ridge RISC complex for Ethernet transmission |
| UNI User-Network Interface | The interface between ATM user equipment and an ATM network. |
| VC Virtual Channel | A communication channel that provides for the sequential unidirectional transport of ATM cells. |
| VCC Virtual Channel Connection | A virtual channel that has end-to-end significance and is a concatenation of the virtual channel links that extends between the points where the ATM service users access the ATM Layer. The points at which the ATM cell payload is passed to, or received from, the users of the ATM Layer for processing signify the endpoints of a VCC. |
| VCI | Virtual Circuit Identfier. A 16 bit address used to identify an ATM connection. |
| VP | Virtual Path A logical association or bundle of VCs. |
| VPC Virtual Path Connection | A concatenation of virtual path links. |
| VPI Virtual Path Identifier | A 8 bit value used to identify an ATM path and carried in the cell header. Like a VCI it is locally significant and refers to the VPL active on the local UNI which comprises a large scope VPC. |
| WAN Wide Area Network | A system designed to interconnect computers within a campus. |

We claim:

1. A digital communications system comprising:

a connection-oriented transport fabric;

a plurality of user devices attached to the system, at least some of said user devices including LAN interface adapters for connection to said transport fabric through one or more local area networks (LANs);

interface means between said transport fabric and said user devices storing the location of said user devices, said interface means between said transport fabric and said user devices that are connected to LANs adapting LAN traffic for transport over said transport fabric; and a centralized route server connected to said transport fabric storing address data pertaining to the location of said user devices attached to the system, said centralized route server exchanging data over said transport fabric with said interface means to learn the locations of said user devices and to distribute such information to said interface means so as to permit said interface means to establish direct transparent communication on demand using a dynamic mesh of virtual connections between a said user device connected thereto and another said user device attached to the system.

2. A digital communications system as claimed in claim 1, further comprising a system manager controlling the operation of said connection-oriented transport fabric and informing the route server of the topology thereof.

3. A digital communications network comprising:

a connection-oriented transport fabric;

a plurality of peripheral devices;

interface means between said transport fabric and said peripheral devices storing the location of said peripheral devices;

a centralized route server connected to said transport fabric storing address data pertaining to the location of said peripheral devices, said centralized route server exchanging data over said transport fabric with said interface means to learn the locations of said peripheral devices and to distribute such information so as to permit said interface means to establish direct transparent communication on demand using a dynamic mesh of virtual connections between a said peripheral device connected thereto and another said peripheral device attached to the system.

4. A digital communications system as claimed in claim 3, wherein at least some of said peripheral devices are connected to said interface means over a network.

5. A digital communications system as claimed in claim 4, wherein said network is a connectionless network.

6. A method of establishing communications between user devices connected to a digital communications system comprising the steps of:

providing access means to said connection-oriented network;

storing address data pertaining to the location of said peripheral devices attached to the system in a centralized route server connected to said connection-oriented network; and exchanging address data over said connection-oriented network with said interface means to learn the locations of said peripheral devices and to distribute such information to said access means so as to permit said access means to establish direct transparent communication on demand using a dynamic mesh of virtual connections between a said peripheral device connected thereto and another said peripheral device attached to the system.

7. A method as claimed in claim 6, wherein said access means set up switched virtual connections through said ATM network to establish communication therebetween based on address data received from said centralized route server.

* * * * *